United States Patent [19]

Carpenter et al.

[11] 4,262,031
[45] Apr. 14, 1981

[54] COOKED PUDDING COMPOSITION CONTAINING HIGHLY-DUTCHED COCOA AND PROCESS

[75] Inventors: John R. Carpenter, Dover; Wayne L. Steensen, Newark; Clement R. Wyss, Lewes, all of the, Del.

[73] Assignee: General Foods Corporation, White Plains, N.Y.

[21] Appl. No.: 67,647

[22] Filed: Aug. 17, 1979

[51] Int. Cl.³ .............................................. A23L 1/187
[52] U.S. Cl. .................................... 426/548; 426/579; 426/584; 426/631; 426/583; 426/804
[58] Field of Search ............... 426/578, 579, 631, 584, 426/548, 804, 583

[56] References Cited

U.S. PATENT DOCUMENTS

| 3,619,209 | 11/1971 | Hegadorn | 426/579 |
| 3,669,687 | 6/1972 | D'Ercole | 426/579 |
| 3,671,269 | 6/1972 | Germino | 426/579 |
| 3,733,209 | 5/1973 | Gupta et al. | 426/554 |
| 3,754,935 | 8/1973 | Glicksman | 426/579 |
| 3,770,460 | 11/1973 | Stewart et al. | 426/579 |
| 3,770,461 | 11/1973 | Stewart et al. | 426/579 |
| 3,917,875 | 11/1975 | Gardiner | 426/573 |
| 3,928,650 | 12/1975 | Bohrmann et al. | 426/579 |
| 3,955,009 | 5/1976 | Eskritt et al. | 426/578 |
| 3,982,042 | 9/1976 | Arden | 426/631 |

*Primary Examiner*—Jeanette M. Hunter
*Attorney, Agent, or Firm*—Mitchell D. Bittman

[57] ABSTRACT

A cooked pudding composition containing highly-dutched cocoa and which maintains a sharp pie cut and a firm texture is prepared by incorporating an amount of an acidulant effective to impart a desired texture and viscosity to the resultant cooked pudding from about 6.3 and adjust the pH of the cooked pudding up to about 6.7.

34 Claims, No Drawings

COOKED PUDDING COMPOSITION CONTAINING HIGHLY-DUTCHED COCOA AND PROCESS

BACKGROUND OF THE INVENTION

The present invention relates to stabilized cocoa flavored and colored cooked pudding products and methods of making the same. More particularly the present invention is directed to a cooked pudding composition containing highly-dutched cocoa (i.e., having a pH of from 7.0 to 8.5) which maintains a sharp pie cut and a firm texture.

Up to the present time virtually all cocoa flavored and colored cooked pudding products were formulated with natural or lightly-dutched cocoas having a pH below 7.0. Cooked puddings previously prepared containing highly-dutched cocoas (i.e., having a pH above 7.0) exhibited a loss of appearance, texture and mouth-feel in that the puddings prepared had a soft texture, a lower viscosity and were not able to maintain a clean pie cut. This inability to use highly-dutched cocoa in cooked puddings products presented serious drawbacks in that highly-dutched cocoas possess a better color, flavor and can be used at lower levels than its natural, or lightly-colored cocoa counterparts.

Thus, it is a main feature of the present invention to prepare a cooked pudding composition containing a highly-dutched cocoa which maintains the appearance, textural and mouth-feel attributes associated with cooked pudding products prepared with natural or lightly-dutched cocoas.

It is a further feature of this invention to prepare a cooked pudding composition containing highly-dutched cocoa which maintains a sharp pie cut and a firm texture.

It is also a feature of this invention to prepare a cooked pudding composition which can utilize reduced levels of cocoa to obtain optimum color and flavor.

SUMMARY OF THE INVENTION

Briefly, the above and other features of the present invention are achieved by incorporating the a pudding mix containing a highly-dutched cocoa (i.e., having a pH above 7.0) an amount of an acidulant effective to impart a desired texture and viscosity and a pH up to about 6.7 in the resultant cooked pudding. Preferably, the pH of the resultant cooked pudding is adjusted to within the range of about 6.3 to 6.6. Upon hydrating, cooking and cooling this pudding mix, the resultant pudding possesses a firm texture and a sharp pie cut characteristic of cooked puddings prepared utilizing natural or lightly-dutched cocoa. The preferred starch in the pudding composition is corn starch, while the preferred acidulant is acid whey.

BACKGROUND OF THE INVENTION

The advantages of utilizing a cocoa which is dutched is that when the cocoa is treated with an alkaline substance it develops a darker color and the flavor is intensified. This enables one to use reduced (i.e., 15–25% by weight less) amounts of highly-dutched cocoas to obtain the same flavor and color intensity as obtained with higher amounts of natural or light-duched cocoas. By definition, a highly-dutched cocoa is herein defined as a cocoa which is dutched to the extent that the pH is above 7.0. Preferably, the highly-dutched cocoa will have a pH within the range of 7.0 to 8.1.

When a highly-dutched cocoa was added in a cooked pudding composition there was observed a loss of texture, viscosity and mouth-feel. Thus, to obtain an optimum texture, mouth-feel, viscosity and appearance the art was previously restricted to the use of higher amounts of natural or lightly-dutched cocoa or the use of artificial colors and flavors with the natural or lightly-dutched cocoa. The instant invention enables the preparation of a cooked pudding composition without artificial colors or flavors containing the highly-dutched cocoa while maintaining the optimum texture, mouth-feel, viscosity and appearance characteristics by incorporating an amount of an acidulant effective to adjust the pH of the resultant cooked pudding to 6.7 or below and impart a desired pudding texture and viscosity. Preferably the pH of the resultant cooking pudding is adjusted to within the range of about 6.3 to 6.6.

The pudding mix for preparing a cooking pudding composition may contain ingredients as are common to the art. Generally the mix will contain an ungelatinized starch, a milk component, and optionally, ingredients such as sweeteners, stabilizers (e.g. gelatin and gums such as xanthan, agar, furcelleran, locust bean, carrageenan, etc., or combinations thereof), emulsifiers (e.g. Polysorbate 60, lecthin, mono and diglycerides, sodium stearoyl-2-lactylate, etc.), flavors, colors etc. While preferably the pudding compositions is sweetened with a sweetener such as a sugar (e.g. sucrose, dextrose, invert sugar, fructose, corn syrups, etc.) dextrins, etc. which sweetens as well as adds solids and body to the pudding composition, alternatively low calorie sweeteners such as saccharin, L-aspartic acid derivatives, cyclamate, etc., may also be employed. The ungelatinized starch can be a raw starch and/or a modified starch, and while corn starch is the preferred starch, other starches such as tapioca or waxy-maize are also suitable. The pudding mix also contains a milk component (e.g. skim or whole milk) which may be satisfied by either hydrating the ingredients of the pudding mix with milk, or by adding milk solids to the pudding mix and upon hydration, adding water.

Generally, for a pudding sweetened with sugar, the percent by weight range of ingredients for a dry pudding mix (to be hydrated with water or milk) and the percent by weight range of ingredients of a prepared pudding composition (already hydrated) are as follows:

|  | % by weight of dry pudding mix | % by weight of prepared pudding composition |
| --- | --- | --- |
| Starch | 5–40% | 2–8% |
| Sugar | 20–80% | 3–20% |
| Milk Solids | 0–75% | 5–15% |
| Water | — | 50–90% |
| Stabilizers | 0–8% | 0–2% |
| Emulsifiers | 0–2% | 0–0.5% |
| Cocoa Solids | 4–20% | 1–5% |

Generally, for a pudding sweetened with a low calorie sweetener, the percent by weight range of ingredients for a dry pudding mix and the percent by weight range of ingredients of a prepared pudding composition are as follows:

|  | % by weight of dry pudding mix | % by weight of prepared pudding composition |
| --- | --- | --- |
| Starch | 25–98% | 3–10% |
| Low Calorie Sweetener | as desired | as desired |
| Milk Solids | 0–85% | 7–20% |
| Water | — | 60–95% |
| Stabilizers | 0–30% | 0–3% |
| Emulsifiers | 0–4% | 0–0.8% |
| Cocoa Solids | 2–30% | 0.5–4.0% |

Critical to the present invention is the addition of an amount of an acidulant effective to impart a desired texture and viscosity and adjust the pH of the resultant cooked pudding up to about 6.7, preferably addition of an amount effective to adjust the pH of the cooked pudding to within the range of about 6.3 to 6.6, optimally 6.4 to 6.5. It is theorized that the alkalinity of the highly-dutched cocoa interferes with the gelling of the starch in a milk-containing cooked pudding system, thus resulting in a decrease of its textural, mouth-feel, viscosity and appearance characteristics. However, this is only intended as a theory and the present invention is not limited thereto. It has been discovered that the pH of the resultant cooked pudding plays a decisive role in the physical characteristics of the cooked pudding. The instant invention adjusts the pH of the resultant cooked pudding by the addition of an amount of an acidulant effective to obtain a pH of 6.7 or below and to obtain a desired pudding texture and viscosity. Preferably, the amount of acidulant is effective to adjust the pH of the resultant cooked pudding to within a range of 6.3 to 6.6 to provide a pudding with a firm texture, a clean pie cut, and a desirable viscosity and mouth-feel.

The preferred acidulant is acid whey (liquid or powder), however food grade acids such as citric, fumaric, adipic, tartaric, malic, ascorbic, lactic, acetic, etc. are also suitable to neutralize the residual alkalinity of the highly-dutched cocoa in the cooked pudding composition. Acid whey is derived from milk, contains about 5–9% lactic acid, and about 2 to 8 grams of acid whey would be needed to neutralize about 12 grams of highly-dutched cocoa. When a food grade acid is employed in a dry pudding mix for preparing the cooked pudding composition, preferably the acid is encapsulated (e.g. by fat, sugar, etc.) to prevent any interaction between the starch (or other ingredients) and the acid and thus prolongs the shelf life and the storage stability of the dry pudding mix.

Generally the viscosity of a cooked pudding composition is within the range of about 60,000 to 115,000 centipoises, while the viscosity of a cooked pie filling is within the range of about 80,000 to 130,000 centipoises. Upon the addition of a highly-dutched cocoa to a cooked pudding composition or pie filling without an acidulant there is observed a reduction in viscosity ranging from 8,000 to 30,000 centipoises, as well as the texture becoming softer and soupy and the inability of the pudding to maintain a sharp pie cut. The addition of an acidulant, such as acid whey, will increase the viscosity of the resultant cooked pudding by about 8,000 to 30,000 centipoises and will impart a firm texture (smoother, firmer mouth-feel) and lengthen the time that a pudding will retain its shape after cutting (i.e. maintains a sharp pie cut).

The process of the instant invention involves mixing and hydrating the ungelatinized starch, sweetener, milk component, dutched cocoa, and acidulant, followed by cooking the hydrated pudding mixture and then cooling the cooked pudding. The hydration can either be carried out with milk as the milk component, or with water if the composition contains milk solids as the milk component. Cooking is carried out to gelatinize the starch in the pudding mixture and typically it is carried out at temperatures greater than 150° F. (65° C.), for a starch such as cornstarch. While the pudding composition of the instant invention would typically be sold as a dry mix to be hydrated, cooked and cooled by the consumer, it may also be hydrated, cooked, cooled, packaged (e.g. canned) and optionally frozen by a manufacturer, and then sold to the consumer in the prepared form. The cooked pudding composition and dry pudding mix of this invention can be used as a pie filling or the like, as well as a pudding.

EXAMPLE I

A dry pudding mix was prepared by mixing together the following ingredients:

| Ingredient | Grams |
| --- | --- |
| Sugar | 60 |
| Raw Cornstarch | 17 |
| Highly-Dutched Cocoa Powder (pH-7.23) | 12 |
| Modified Cornstarch | 8 |
| Acid Whey Powder | 3 |
| Salt | 1 |
| Vanilla Flavor | 0.25 |
| Calcium Carrageenan | 0.2 |
| Polysorbate 60 | 0.2 |

The dry pudding mix was hydrated by mixing it with 2 cups (474 ml) of cold milk. The hydrated pudding mix was then cooked over medium heat until the pudding came to a boil, followed by chilling the pudding for about 1 to 2 hours to set the pudding. The pH of the resultant cooked pudding was about 6.4.

To prepare a pie filling the dry pudding mix is hydrated with 2¼ cups (533 ml) of cold milk, followed by cooking the hydrated mix to a full bubbling boil, then chilling for 3 hours. The pH of the resultant cooked pie filling was about 6.4.

Both the cooked pudding composition and the cooked pie filling exhibited a sharp pie cut (retained shape after cutting with a spoon), a firm texture and a desirable color, flavor, mouth-feel, appearance and viscosity. These physical properties obtained were judged to be equivalent, if not slightly superior (especially in color and flavor), to those obtained with cooked pudding products or pie fillings containing natural or lightly-dutched cocoas.

EXAMPLE II

A dry pudding mix was prepared by mixing together the following ingredients:

| Ingredient | Grams |
| --- | --- |
| Sugar | 60 |
| Raw Cornstarch | 17 |
| Highly-Dutched Cocoa Powder (pH-7.23) | 12 |
| Modified Cornstarch | 8 |
| Encapsulated Fumaric Acid | 0.2 |
| Salt | 1 |
| Vanilla Flavor | 0.25 |

| Ingredient | Grams |
| --- | --- |
| Calcium Carrageenan | 0.2 |
| Polysorbate 60 | 0.2 |

The acidulant was fumaric acid which had been encapsulated with a vegetable fat, the fat having a melting point of 130° F. (55° C.). The dry pudding mix was hydrated by mixing it with 2 cups (474 ml) of cold milk. The hydrated pudding mix was then cooked over medium heat until the pudding came to a boil, followed by chilling the pudding for about 1 to 2 hours to set the pudding. The pH of the resultant cooked pudding was about 6.4.

To prepare a pie filling the dry pudding mix is hydrated with 2¼ cups (533 ml) of cold milk, followed by cooking the hydrated mix to a full bubbling boil, then chilling for 3 hours. The pH of the resultant cooked pie filling was about 6.4.

Both the cooked pudding composition and the cooked pie filling exhibited a sharp pie cut (retained shape after cutting with a spoon), a firm texture and a desirable color, flavor, mouth-feel, appearance and viscosity. These physical properties obtained were judged to be equivalent, if not slightly superior (especially in color and flavor), to those obtained with cooked pudding products or pie fillings containing natural or lightly-dutched cocoas.

What is claimed is:

1. Process for preparing a cooked pudding composition containing a highly-dutched cocoa comprising:

mixing and hydrating an ungelatinized starch, a sweetener, a milk component, a dutched cocoa having a pH above 7.0, and an amount of an acidulant effective to impart a desired texture and viscosity to the cooked pudding and adjust the pH of the cooked pudding from about 6.3 up to about 6.7;

cooking the hydrated pudding mixture; and cooling the cooked pudding to set the pudding.

2. Process of claim 1 wherein the amount of acidulant is effective to adjust the pH of the cooked pudding to about 6.3 to 6.6.

3. Process of claim 1 wherein the starch is chosen from the group consisting of cornstarch, tapicoa starch and waxy-maize starch.

4. Process of claim 2 wherein the starch is a cornstarch.

5. Process of claim 3 wherein the starch comprises a raw starch and a modified starch.

6. Process of claim 1 further comprising a stabilizer.

7. Process of claim 6 wherein the stabilizer is a gum.

8. Process of claim 1 further comprising an emulsifier.

9. Process of claims 1 or 2 wherein the acidulant is acid whey.

10. Process of claims 1 or 2 wherein the acidulant is a food grade acid.

11. Process of claim 10 wherein the acid is encapsulated.

12. Process of claim 4 wherein the amount of acidulant is effective to adjust the pH to about 6.4 to 6.5.

13. Process of claim 1 wherein the milk component is a milk solids and the mixture is hydrated with a water.

14. Process of claim 1 wherein the mixture is hydrated with a liquid milk, and the milk component is said liquid milk.

15. Process of claim 1 further comprising packaging said cooked pudding.

16. Process of claim 1 further comprising freezing said cooked pudding.

17. Process of claim 1 wherein the sweetener is a sugar.

18. Process of claim 1 wherein the sweetener is a low calorie sweetener.

19. Product produced by the process of claim 1.

20. Dry pudding mix containing highly dutched cocoa for preparing a milk-containing cooked pudding composition comprising:

an ungelatinized starch; a sweetener; a dutched cocoa having a pH above 7.0; and an amount of an acidulant effective to impart a desired texture and viscosity to the cooked pudding and adjust the pH of the cooked pudding up to about 6.7.

21. Mix of claim 20 wherein the amount of acidulant is effective to adjust the pH of the cooked pudding to about 6.3 to 6.6.

22. Mix of claim 20 wherein the amount of acidulant is effective to adjust the pH of the cooked pudding to about 6.4 to 6.5.

23. Mix of claim 20 wherein the acidulant is acid whey.

24. Mix of claim 20 wherein the acidulant is a food grade acid.

25. Mix of claim 24 wherein the food grade acid is encapsulated.

26. Mix of claim 20 wherein the starch is a raw starch and a modified starch.

27. Mix of claim 20 wherein the starch is chosen from the group consisting of cornstarch, tapioca starch or waxy maize starch.

28. Mix of claim 21 wherein the starch of cornstarch.

29. Mix of claim 20 further comprising a stabilizer.

30. Mix of claim 29 wherein the stabilizer is a gum.

31. Mix of claim 20 further comprising an emulsifier.

32. Mix of claim 20 further comprising milk solids.

33. Mix of claim 20 wherein the sweetener is a sugar.

34. Mix of claim 20 wherein the sweetener is a low calorie sweetener.

* * * * *